(12) United States Patent
Park et al.

(10) Patent No.: US 11,182,515 B2
(45) Date of Patent: Nov. 23, 2021

(54) APPARATUS FOR DIAGNOSING ANALYSIS AND METHOD THEREFOR

(71) Applicant: DOOSAN HEAVY INDUSTRIES & CONSTRUCTION CO., LTD., Changwon-si (KR)

(72) Inventors: Jee Hun Park, Gwangmyeong-si (KR); Jae Hyeon Park, Hwaseong-si (KR); Sang Jin Lee, Yongin-si (KR); Hyun Sik Kim, Gimpo-si (KR)

( * ) Notice: Subject to any disclaimer, the term of this patent is extended or adjusted under 35 U.S.C. 154(b) by 234 days.

(21) Appl. No.: 16/574,054

(22) Filed: Sep. 17, 2019

(65) Prior Publication Data

US 2020/0159885 A1 May 21, 2020

(30) Foreign Application Priority Data

Nov. 16, 2018 (KR) .......................... 10-2018-0141395

(51) Int. Cl.
*G06F 30/17* (2020.01)
*G06F 30/20* (2020.01)
(Continued)

(52) U.S. Cl.
CPC .............. *G06F 30/17* (2020.01); *G06F 30/20* (2020.01); *G06F 2111/10* (2020.01); *G06F 2111/20* (2020.01)

(58) Field of Classification Search
CPC ...... G06F 30/17; G06F 30/20; G06F 2111/20; G06F 2111/10
See application file for complete search history.

(56) References Cited

U.S. PATENT DOCUMENTS 8,725,470 B1  5/2014  Brown et al.
2003/0014692 A1*  1/2003  James ................. G06F 11/2263
714/25
(Continued)

FOREIGN PATENT DOCUMENTS

JP         05-54058 A     3/1993
JP         07-084991 A    3/1995
(Continued)

OTHER PUBLICATIONS

Park, Kyoo-seon, Taimoor Asim, and Rakesh Mishra. "Computational fluid dynamics based fault simulations of a vertical axis wind turbines." In Journal of Physics: Conference Series, vol. 364, No. 1, p. 012138. IOP Publishing, 2012. (Year: 2012).*

*Primary Examiner* — Chuen-Meei Gan
(74) *Attorney, Agent, or Firm* — Harvest IP Law, LLP

(57) ABSTRACT

An apparatus and method for diagnosing analysis is provided. The apparatus includes an analytic layer to divide a peripheral space of a target component into a plurality of cells and to derive analytic data by performing a numerical analysis iteration according to computational fluid dynamics for the plurality of cells; a model layer to derive an analytic model that simulates the numerical analysis iteration; a predictive layer to derive predictive data by predicting a result of the numerical analysis iteration by using the analytic model; and a diagnostic layer to diagnose an abnormality condition of numerical analysis by comparing the analytic data and predictive data during the numerical analysis iteration performed by the analytic layer. The diagnostic layer includes an early alarm to generate early alarm information by sorting a cell satisfying an early alarm condition; and an abnormality diagnostic device to determine whether the numerical analysis iteration is abnormal.

20 Claims, 12 Drawing Sheets

(51) Int. Cl.
    *G06F 111/10*         (2020.01)
    *G06F 111/20*         (2020.01)

(56) References Cited

U.S. PATENT DOCUMENTS

| | | | |
|---|---|---|---|
| 2005/0049838 A1* | 3/2005 | Danko | G06F 17/13 |
| | | | 703/2 |
| 2015/0006133 A1* | 1/2015 | Abramovitch | G06F 30/20 |
| | | | 703/2 |
| 2015/0160098 A1* | 6/2015 | Noda | G05B 23/024 |
| | | | 702/35 |
| 2016/0179992 A1* | 6/2016 | Van der Velden | G06F 30/00 |
| | | | 703/2 |

FOREIGN PATENT DOCUMENTS

| | | |
|---|---|---|
| JP | 2001-117908 A | 4/2001 |
| KR | 10-1827108 B1 | 2/2018 |
| KR | 20180057780 A | 5/2018 |
| KR | 10-1852527 B1 | 6/2018 |

\* cited by examiner

APPARATUS FOR DIAGNOSING ANALYSIS AND METHOD THEREFOR

CROSS-REFERENCE TO RELATED APPLICATION

This application claims priority to Korean Patent Application No. 10-2018-0141395, filed on Nov. 16, 2018, the disclosure of which is incorporated by reference herein in its entirety.

BACKGROUND

Field

Apparatuses and methods consistent with exemplary embodiments relate to an analysis technology, and more particularly, to an apparatus for diagnosing whether the analysis results using a learned model are abnormal and a method therefor.

Description of the Related Art

Analysis is essential in the design and manufacture of high performance, high reliability core components. Such analysis may include computational fluid analysis, structural analysis, and/or electromagnetic analysis. Here, a turbine blade design may require computational fluid analysis and structural analysis, and a motor design may require electromagnetic analysis. Further, this analysis generally requires a few tens of iterations to make a proper design, and each iteration is time consuming. An instance of computational fluid analysis, for example, usually takes four hours or more.

However, during an instance of analysis, error may be introduced in the grid design, the operation condition setting, or the setting of the numerical value of an important parameter, resulting in an abnormal or interrupted analysis. In this case, the analysis must be performed anew, wasting time accordingly.

Accordingly, there is a need for a technique whereby wasted time can be prevented by predicting abnormal analysis results based on an abnormality symptom that is present during the analysis.

SUMMARY

Aspects of one or more exemplary embodiments provide an apparatus for diagnosing analysis and a method therefor, which may predict an abnormal analysis based on an abnormality condition (symptom) detected during the analysis, thereby preventing an unproductive instance of analysis from unnecessarily continuing Additional aspects will be set forth in part in the description which follows and, in part, will become apparent from the description, or may be learned by practice of the exemplary embodiments.

According to an aspect of an exemplary embodiment, there is provided an apparatus for diagnosing analysis. The apparatus may include an analytic layer configured to divide a peripheral space of a design target component into a plurality of cells, and to derive analytic data by performing a numerical analysis iteration according to computational fluid dynamics for the plurality of cells; a model layer configured to derive an analytic model that simulates the numerical analysis iteration; a predictive layer configured to derive predictive data by predicting a result of the numerical analysis iteration by using the analytic model; and a diagnostic layer configured to diagnose an abnormality condition of numerical analysis by comparing the analytic data with the predictive data during the numerical analysis iteration performed by the analytic layer.

The diagnostic layer may include an early alarm configured to generate early alarm information by sorting a cell that satisfies a predetermined early alarm condition among the plurality of cells; and an abnormality diagnostic device configured to determine whether the result of the numerical analysis iteration is abnormal based on the early alarm information. Here, the early alarm may include a residual generator configured to derive residual data by obtaining a difference between the analytic data and the predictive data; and an alarm information device configured to generate the early alarm information by sorting a cell in which at least one of the analytic data, the predictive data, and the residual data satisfies the predetermined early alarm condition among the plurality of cells. Based on the early alarm information, the abnormality diagnostic device may transmit an analysis interrupt command to the analytic layer so that the analytic layer interrupts the numerical analysis iteration, when satisfying a predetermined abnormality condition by determining whether at least one of the plurality of cells, a plurality of cell groups, and all of the cells of the plurality of cells satisfies the predetermined abnormality condition.

The model layer may include an analytic data storage configured to store the analytic data comprising a plurality of input signals used for the numerical analysis and a plurality of output signals corresponding to each of the plurality of input signals; and an analytic model deriver configured to generate the analytic model that simulates the numerical analysis iteration through the analytic data. Here, the analytic model deriver may constitute the relationship equation of the analytic model in which a parameter is not determined, and generates the analytic model by deriving the parameter through learning using the analytic data. In addition, the model layer may further include a preprocessor configured to perform preprocessing that corrects or removes the analytic data according to a predetermined condition; and a data analyzer configured to derive the relationship between cells of the plurality of cells and the relationship between data in the cells by analyzing the preprocessed analytic data.

The predictive layer may include a numerical analyzer configured to derive base data by performing the numerical analysis iteration for the plurality of cells occupying the divided peripheral space of the design target component; and a predictor configured to derive the predictive data by applying the base data to the analytic model derived by the model layer to predict the result of the numerical analysis iteration, and may further include a predictive optimizer configured to optimize the predictive data derived by the predictor.

According to an aspect of another exemplary embodiment, there is provided an apparatus for diagnosing analysis. This apparatus may include an analytic layer configured to divide a peripheral space of a design target component into a plurality of cells, and to derive analytic data by performing numerical analysis iteration according to computational fluid dynamics for the plurality of cells; a predictive layer configured to derive predictive data by predicting a result of the numerical analysis iteration by using the analytic model that predicts the result of the numerical analysis iteration; and a diagnostic layer configured to diagnose an abnormality condition of numerical analysis by comparing the analytic data with the predictive data during the numerical analysis iteration performed by the analytic layer. Here, the analytic model may include at least one of a parametric model and a non-parametric model, and the parametric model may include a Transfer Function model and a State Space model. More specifically, the analytic model may include a model for simulating the numerical analysis iteration for each of the plurality of cells; a model for simulating the numerical analysis iteration for a cell group including a predetermined number of cells adjacent to each other; a model for simulating the numerical analysis iteration for a cell group including cells having characteristics similar to each other; or a model for simulating the numerical analysis iteration for all of the plurality of cells. In this case, the diagnostic layer may include the above early alarm and the above abnormality diagnostic device.

According to another aspect of the exemplary embodiment, there is provided a method for diagnosing analysis. The method may include steps of dividing a peripheral space of a design target component into a plurality of cells; deriving an analytic model that simulates numerical analysis iteration according to computational fluid dynamics for the plurality of cells; deriving analytic data by performing the numerical analysis iteration; deriving predictive data by predicting a result of the numerical analysis iteration by using the analytic model; and diagnosing an abnormality condition of numerical analysis by comparing the analytic data with the predictive data during the numerical analysis iteration performed by the analytic layer. Here, the diagnosing step may include steps of generating early alarm information by sorting a cell that satisfies a predetermined early alarm condition among the plurality of cells; and determining whether the result of the numerical analysis iteration is abnormal based on the early alarm information. In addition, the early alarm information generation may include steps of deriving residual data by obtaining a difference between the analytic data and the predictive data; and generating the early alarm information by sorting a cell in which at least one of the analytic data, the predictive data, and the residual data satisfies the predetermined early alarm condition among the plurality of cells. Here, the abnormality determination may include transmitting an analysis interrupt command to the analytic layer so that the analytic layer interrupts the numerical analysis iteration, when satisfying a predetermined abnormality condition by determining whether at least one of a plurality of cells, a plurality of cell groups, and all of the cells satisfies the predetermined abnormality condition based on the early alarm information.

The analytic model deriving step may include generating the analytic model that simulates the numerical analysis iteration through the analytic data including a plurality of input signals used for the numerical analysis iteration and a plurality of output signals corresponding to each of the plurality of input signals. In addition, the predictive data deriving step may include deriving base data by performing the numerical analysis iteration for the plurality of cells occupying the divided peripheral space of the design target component; and deriving the predictive data by applying the base data to the analytic model derived by the model layer to predict the result of the numerical analysis iteration.

As described above, according to one or more exemplary embodiments, it is possible to interrupt component design analysis when an analysis abnormality condition or symptom is sensed during the analysis, thereby preventing an unproductive instance of analysis from unnecessarily continuing. Accordingly, development time can be shortened.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
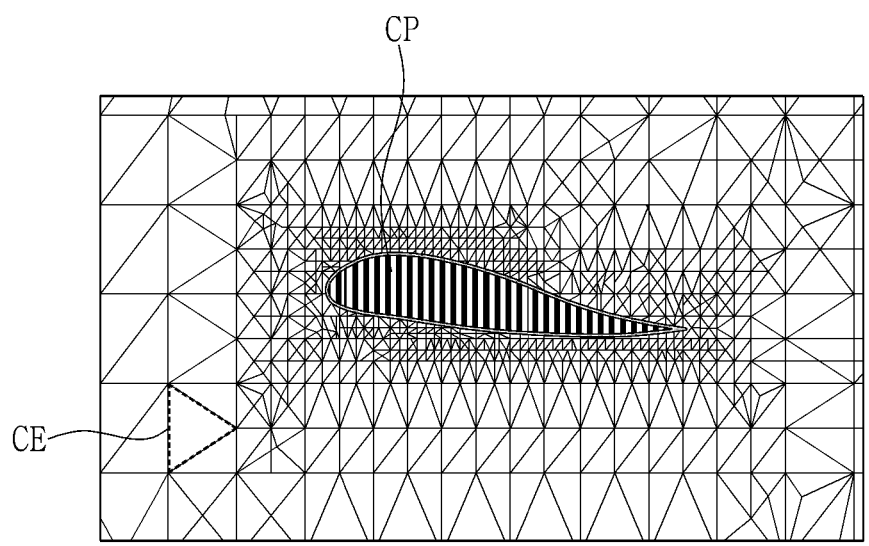
FIG. 1 is a diagram of a design target component having its surrounding area divided into a plurality of cells according to an exemplary embodiment.

Hereinafter, various modifications and various embodiments will be described in detail with reference to the accompanying drawings so that those skilled in the art may easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein. In order to clearly illustrate the disclosure in the drawings, some of the elements that are not essential to the complete understanding of the disclosure may be omitted, and like reference numerals refer to like elements throughout the specification.

The terminology used in the disclosure is for the purpose of describing specific embodiments only and is not intended to limit the scope of the disclosure. The singular expressions "a," "an," and "the" are intended to include the plural expressions as well unless the context clearly indicates otherwise. In the disclosure, terms such as "comprises," "includes," or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

In an exemplary embodiment, an analysis includes an instance of computational fluid dynamics analysis, structural analysis, electromagnetic analysis, etc. An exemplary embodiment may be applied to the above analysis, which may be performed by numerical analysis through a computing operation.

First, an analytic model according to an exemplary embodiment will be described with reference to FIGS. 1-3.

Referring to FIG. 1, an analysis may be performed to design a component (CP) such as a blade of a turbine. This analysis divides the area (peripheral space) around the component (CP) into a plurality of cells (CE), and deriving the physical properties of each of the plurality of cells (CE) according to the boundary condition of the plurality of cells (CE). As noted above, a computational fluid analysis, a structural analysis, or an electromagnetic analysis may be performed by numerical analysis through a computing operation.

Figure 2:
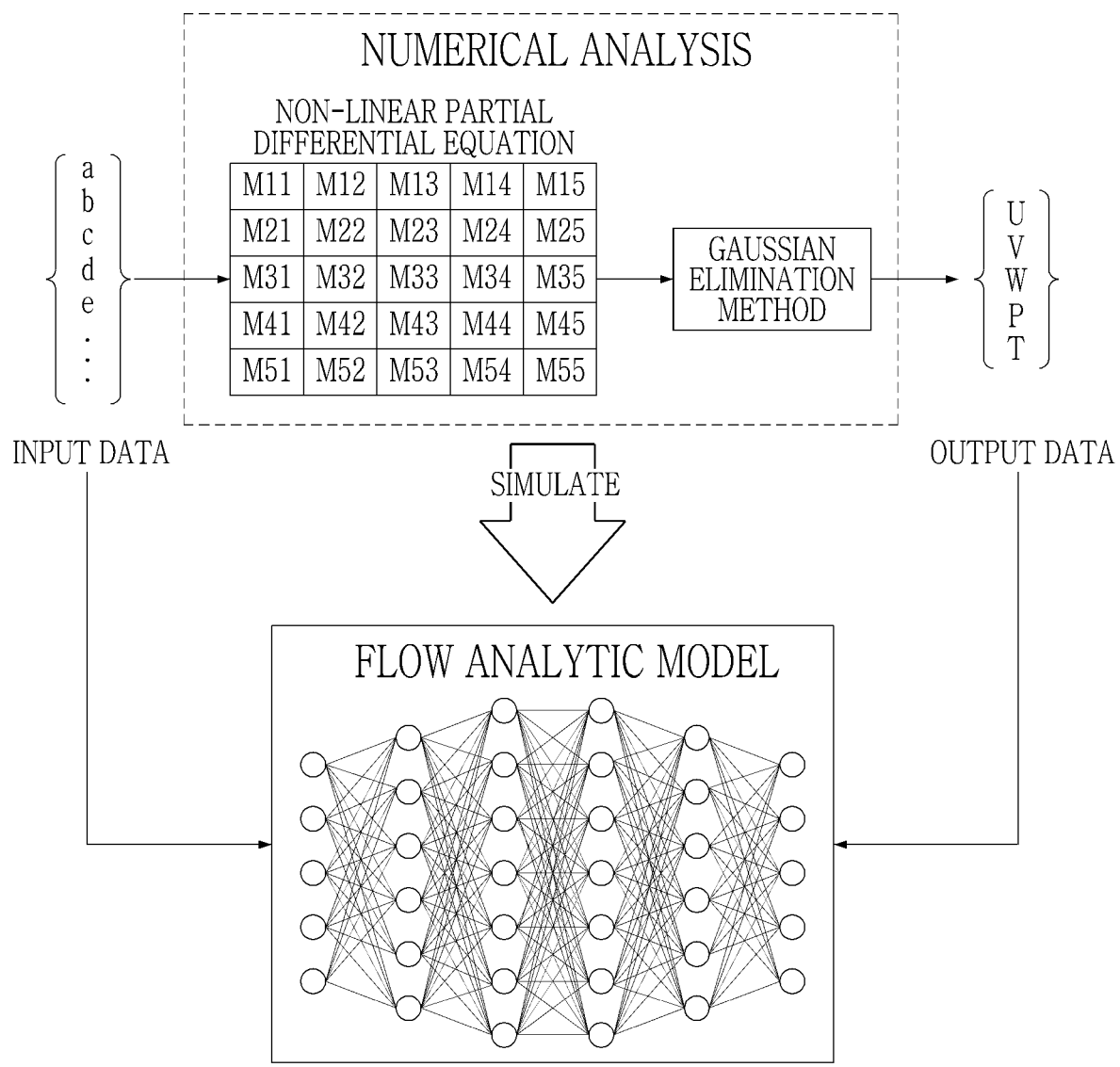
FIG. 2 is a diagram of an analytic model according to an exemplary embodiment.

For example, referring to FIG. 2, a numerical analysis by computational fluid dynamics (CFD) may be performed. For this analysis, an area surrounding the periphery of the component (CP) is divided into a plurality of cells (CE). Further, a nonlinear partial differential equation for the plurality of cells (CE) is established. Subsequently, an approximate solution to the partial differential equation may be obtained, for example, by a Gaussian elimination method.

The CFD numerical analysis is performed multiple times, i.e., a number of iterations, due to the nature of fluid. Conceptually, due to the nature of the fluid, numerical analysis performed based on a predetermined initial number of iterations produces unstable results, which become steady only after a number of additional iterations. That is, numerical analysis by computational fluid dynamics is completed for each of multiple iterations that continue until there is enough fluid around the component. The analytic data is a result value of the numerical analysis being performed multiple times through multiple iterations. The numerical analysis for obtaining an approximate solution to this partial differential equation is time consuming because a parallel processing may not be performed through computing operation.

As described above, during the time consuming process of analysis, error may be introduced in the grid design, the operation condition setting, or the setting of the numerical value of an important parameter, resulting in an abnormal or interrupted analysis, whereby the analysis must be performed anew. Accordingly, a new technology is needed to prevent the waste of time by predicting an abnormal analysis based on an abnormality symptom detected during the analysis. For this purpose, an exemplary embodiment predicts an analysis result through an analytic model for predicting the analysis result at an intermediate time (T+k) of the analysis, determines the abnormality symptom by comparing the predicted analysis result with the actual analysis result, and determines whether to continue the actual analysis according to the determination result.

Figure 3:
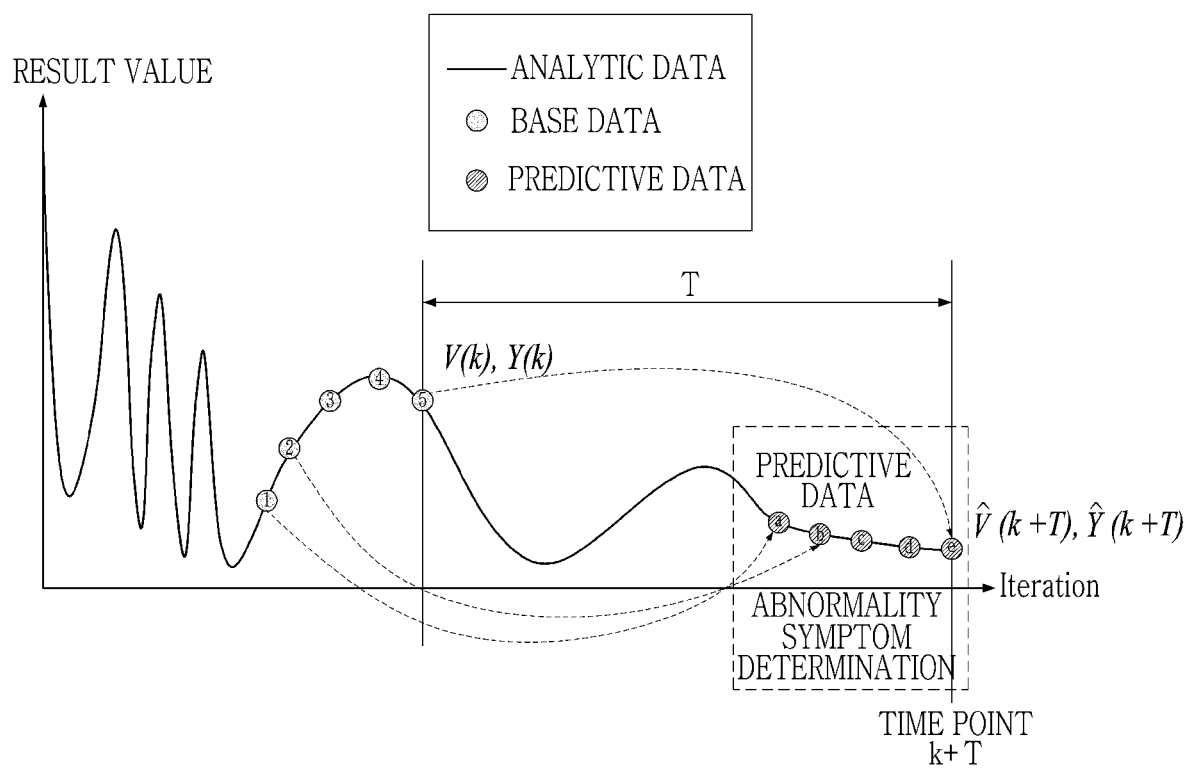
FIG. 3 is a graph plotting analytic data according to a number of analysis iterations for abnormality symptom determination according to an exemplary embodiment.

As a specific example, the graph of FIG. 3 plots analytic data (solid line) as data obtained through CFD numerical analysis. Here, the analytic data includes an input value V(k) input for numerical analysis and output data Y(k) as a result of numerical analysis. A predictive model of an exemplary embodiment derives predictive data from base data, which base data is the analysis result achieved by performing a first number of iterations (k). Thus, the predictive data is obtained by predicting the analysis result achieved through a second number of iterations (k+T). Here, the predictive data includes a predictive value $\hat{V}(k+T)$ of the input value and a predictive value $\hat{Y}(k+T)$ of the output value. The predictive value $\hat{V}(k+T)$ is a value input for numerical analysis upon performing iterations by the second number of times (k+T), and the predictive value $\hat{Y}(k+T)$ is a value output as the result of the numerical analysis upon performing iterations by the second number of times (k+T), where T may be any whole number (0, 1, 2, 3 . . . ). If T=0, the predictive data of the current time point is generated by using the analytic data of the current time point, and an abnormality symptom for the analysis may be predicted and diagnosed by using this.

As described above, an exemplary embodiment determines an abnormality symptom by comparing the analytic data with the predictive data. Here, the analytic data is the result of the actual numerical analysis having performed iterations by the second number of times (k+T) and is a result obtained during analysis before the numerical analysis is completed, that is, at the time point k+T as shown in FIG. 3; and the predictive data is the result (predicted result) of the numerical analysis having performed iterations by the second number of times (k+T) through the analytic model, and determines whether to continue the actual analysis according to the determination result. Accordingly, when the abnormality is found during the analysis, the analysis may be interrupted, thereby saving time and costs.

Meanwhile, the analytic model according to an exemplary embodiment includes at least one of a parametric model including a Transfer Function model and a State Space model and a nonparametric model. Table 1 below indicates examples of the parametric model and the nonparametric model.

TABLE 1

| Parametric Model | Transfer Function | Equation Error | Auto-Regressive eXogeneous (ARX) |
| --- | --- | --- | --- |
| | | | Nonlinear Auto-Regressive eXogeneous (NARX) |
| | | | Finite Impulse Response (FIR) |
| | | | Auto-Regressive Moving Average eXogenious (ARMAX): Pseudolinear Regression Model |
| | | | Auto-Regressive (AR) |
| | | | Auto-Regressive Moving Average (ARMA) |
| | | | Auto-Regressive Auto-Regressive eXogeneous (ARARX): Generalized Least-Squares Model |
| | | | Auto-Regressive Auto-Regressive Moving Average eXogeneous (AR ARM AX): Extended Matrix Model |
| | | Output Error | Output Error (OE) |
| | | | Box and Jenkins (BJ) |
| | State Space | | Linear Time Invariant (LTI), Linear Time Variant (LTV) |
| | | | Linear Model, Nonlinear Model |
| | | | Continuous Time, Discrete Time, Delay Time |
| | | | Single Input Single Output (SISO), Multi Input Multi Output (MIMO) |
| | | | Stochastic Model, Deterministic Model |

TABLE 1-continued

| | |
|---|---|
| | Robust, Open Loop, Closed Loop |
| Non Parametric Model | Non Parametric (Data Set Type) |
| | Impulse Response |
| | Step Response |
| | Frequency Transfer Function |
| | Tree |
| | Neural Network (NN): FF, FB, Radial Basis Function, Convolutional, Spiking, Deep NN (Deep Belief Network), Recurrent NN |

Further, the analytic model may be derived by using at least one of the optimization algorithms listed in Table 2 below.

TABLE 2

| | |
|---|---|
| Parametric Model | Prediction Error Method (PEM) |
| | Maximum Likelihood Method (MLM) |
| | Least-Squares Method (LSM) |
| | Batch Least-Squares Method |
| | Off-line Least-Squares Method |
| | Extended Least-Squares Method (ELSM) |
| | Generalized Least-Squares Method (GLSM) |
| | Recursive Least-Squares Method (RLS) |
| | Instrumental Variable Method (IVM) |
| | Principle Component Analysis (PCA) |
| | Dynamic Principle Component Analysis (DPCA) |
| | Partial Least Squares (PLS) |
| | SubSpace-based State Space Model Identification (4SID) Method |
| | (+ Singular Value Decomposition (SVD)) |
| | (+ QR Decomposition) |
| | N4SID Method |
| | Multivariable Output Error State sPace (MOESP) Method |
| | Canonical VariateAnalysis (CVA) |
| | Singular Value Decomposition |
| | Minimal Realization Method (MRM) |
| Non Parametric Model | Transient Response Method |
| | Correlation Analysis |
| | Frequency Response Method |
| | Spectral Analysis Method |
| | Empirical Transfer Function Estimate (ETFE) Method |
| | Single/multi-layer perceptron learning, Back-propagation, Gradient descent |
| | LayerwisePretraining: Auto-Encoder, BolzmannMachine |

Particularly, referring back to FIG. 1, the analytic model according to an exemplary embodiment may be a model for simulating the numerical analysis for each of the plurality of cells (CE), a model for simulating the numerical analysis for a cell group including the predetermined number of cells (CE) adjacent to each other, a model for simulating the numerical analysis for a cell group including the cells having similar characteristics to each other, or a model for simulating the numerical analysis for all of the plurality of cells (CE), when the space surrounding the periphery of the design target component (CP) is divided into the plurality of cells (CE).

Hereinafter, an apparatus for diagnosing analysis according to an exemplary embodiment will be described with reference to FIGS. 4-8.

Figure 4:
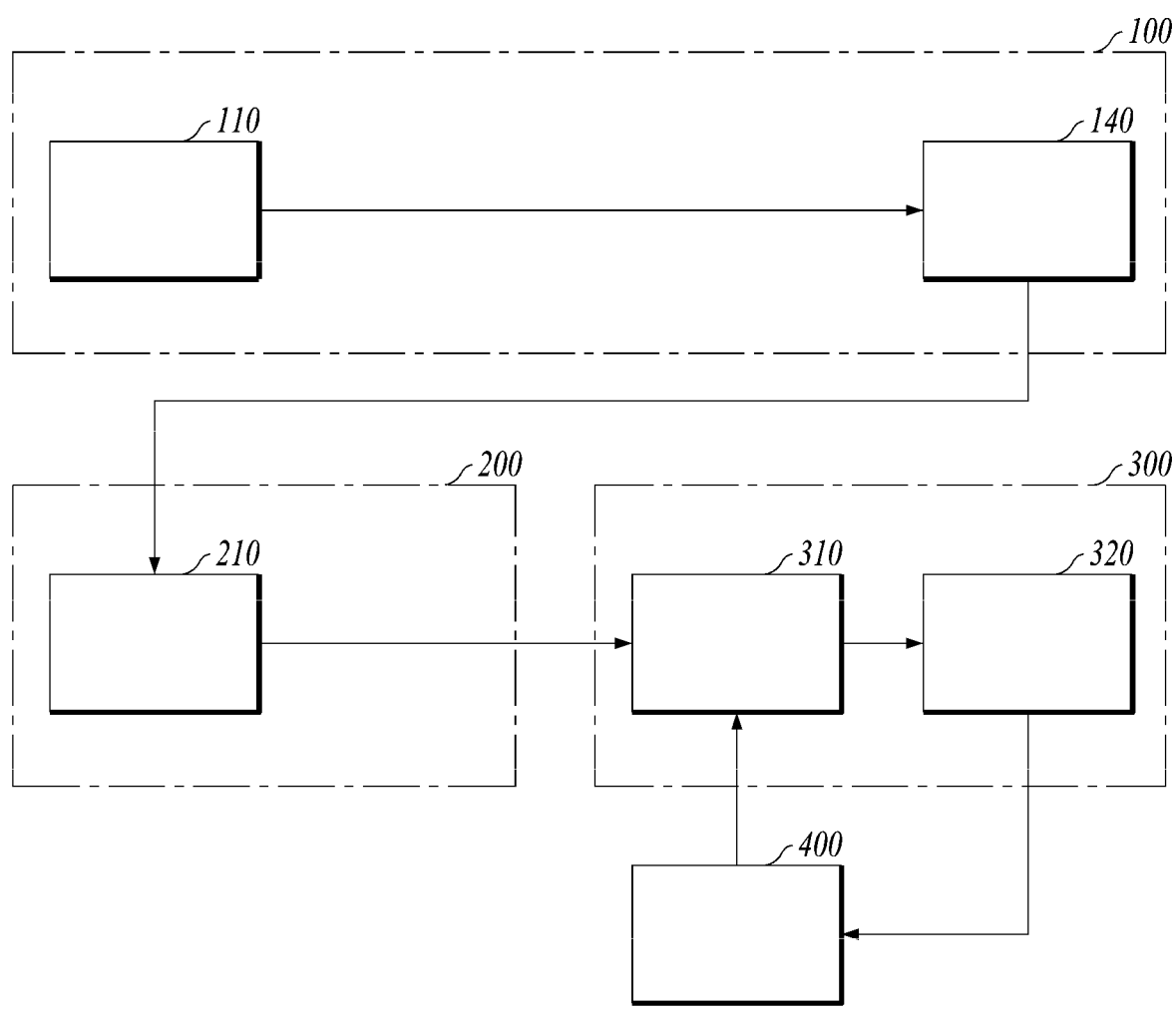
FIG. 4 is a block diagram of an apparatus for diagnosing analysis according to an exemplary embodiment.
Figure 5:
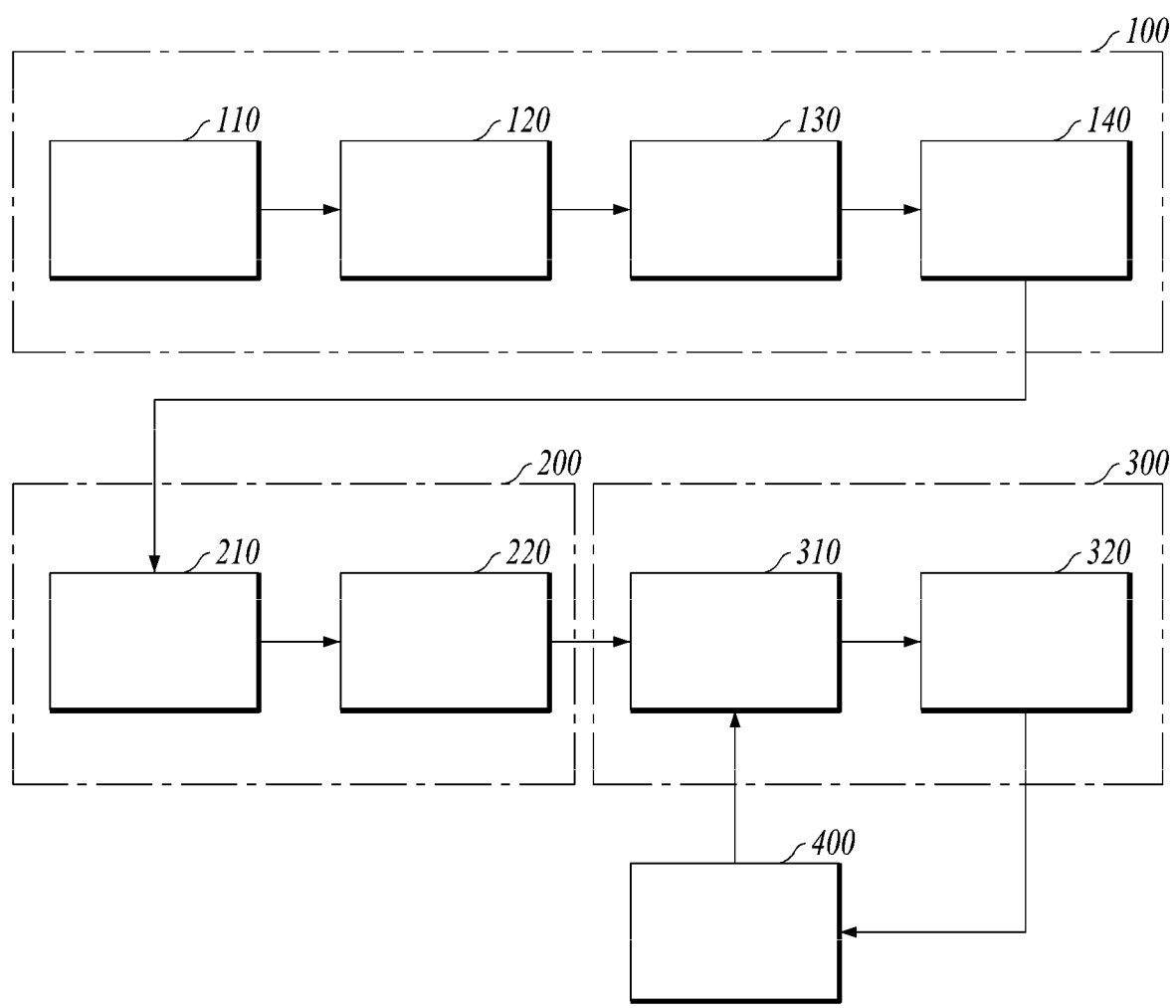
FIG. 5 is a block diagram of an apparatus for diagnosing analysis according to another exemplary embodiment.

First, referring to FIGS. 4 and 5, an analysis apparatus 10 according to an exemplary embodiment includes a model layer 100, a predictive layer 200, a diagnostic layer 300, and an analytic layer 400. Here, the model layer 100 and the predictive layer 200 of FIGS. 4 and 5 differ from each other, respectively.

The analytic layer 400 performs numerical analysis by computational fluid dynamics (CFD). This analytic layer 400 divides the area surrounding the periphery of the component (CP) into a plurality of cells (CE) and outputs analytic data while performing multiple iterations of the CFD numerical analysis.

The model layer 100 generates an analytic model that predicts a result of a plurality of iterated numerical analyses for the component by using the analytic data that are a plurality of input signals used for the numerical analysis of the component and a plurality of output signals corresponding to the plurality of input signals. This analytic model simulates a numerical analysis that is performed multiple times. Particularly, as described above, the analytic model may be composed of a plurality of models, and includes at least one of a parametric model and a nonparametric model.

In the exemplary embodiment of FIG. 4, the model layer 100 includes an analytic data storage 110 and an analytic model deriver 140. In the exemplary embodiment of FIG. 5, the model layer 100 includes the analytic data storage 110, a preprocessor 120, a data analyzer 130, and the analytic model deriver 140.

The analytic data storage 110 stores analytic data according to an exemplary embodiment. The analytic data is data that divides the area around the component (CP) into a plurality of cells (CE) and is used for numerical analysis of the plurality of cells (CE). This analytic data includes a plurality of input signals and a plurality of output signals corresponding to the plurality of input signals. For example, the input signal may be the laminar flow viscosity of the fluid, the turbulent conduction, the time difference between the numerical analysis performed multiple times, etc., in each cell (CE). The output signal means the characteristics of the fluid. For example, the output signal may be the density, the momentum in the x and y directions, the internal energy, etc., in each cell (CE).

The preprocessor 120 performs preprocessing for correcting or removing the analytic data stored in the analytic data storage 110 according to a predetermined condition. The preprocessing for the analytic data includes removing empty data during the numerical analysis iteration performed by the analytic layer, erroneous data, etc., among the analytic data or converting that data into correct numeric values. The preprocessing for the analytic data then selects only the analytic data meeting a predetermined requirement.

The data analyzer 130 derives the relationship between the cells and the relationship between the data in the cell by analyzing the analytic data output by the preprocessor 120. That is, the data analyzer 130 derives the relationship between the cells (CE) and the relationship between the data in the cell (CE) by analyzing the design specification and condition, the relationship between the cells (CE), and the data for each cell (CE).

The analytic model deriver 140 derives the analytic model for predicting an output signal of the numerical analysis having been performed multiple times (iterations) by using the analytic data that are the plurality of input signals used for the numerical analysis and the plurality of output signals corresponding to the plurality of input signals. This analytical model simulates the numerical analysis having been performed multiple times.

The analytic model deriver 140 constitutes a relationship equation of the analytical model where parameters are not determined, and then derives the parameters through an optimization algorithm by substituting the analytic data into the relationship equation. Accordingly, the analytic model deriver 140 can generate the analytic model by applying the derived parameters to the relationship equation of the analytic model. For example, the analytic model deriver 140 may constitute the relationship equation of the analytical model where the parameters for determining the relationship between the input signal and the output signal of the numerical analysis performing multiple iterations are unknown, and then derive the parameters by learning a plurality of analytic data to the constituted relationship equation. As a result, the analytic model deriver 140 may derive the analytic model.

The predictive layer 200 is configured to predict the result of numerical analysis for the plurality of cells (CE) that divides the peripheral space of the design target component (CP) by using the analytic model derived by the model layer 100. According to an exemplary embodiment, the predictive layer 200 includes an analysis predictor 210, as shown in FIG. 4. Further, according to another exemplary embodiment, as shown in FIG. 5, the predictive layer 200 includes the analysis predictor 210 and a predictive optimizer 220.

Figure 6:
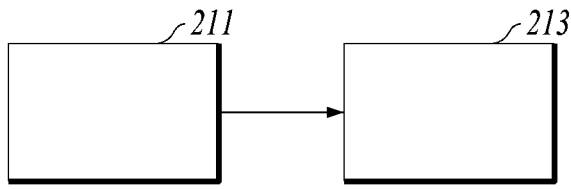
FIG. 6 is a block diagram of an analytic predictor of FIG. 4 or 5 according to an exemplary embodiment.

The analysis predictor 210 predicts the result of the numerical analysis performed multiple times (k+T) through the analytic model generated by the analytic model deriver 140. That is, the analysis predictor 210 predicts an output signal of the numerical analysis performed multiple times (k+T) by inputting the analytic model generated by the analytic model deriver 140 based on the analytic data. This analysis predictor 210 includes a numerical analyzer 211 and a predictor 213, as shown in FIG. 6.

The numerical analyzer 211 outputs base data by performing the numerical analysis for the plurality of cells that divide the peripheral space of a design target component. Accordingly, an input signal for the numerical analysis and an output signal corresponding thereto are derived. Referring to FIG. 3, the numerical analyzer 211 generates the base data by performing the numerical analysis iteration only a predetermined times (k). At this time, the numerical analyzer 211 derives the base data including the input signal and the output signal by the numerical analysis. For example, as shown in FIG. 3, the numerical analyzer 211 may derive the base data, that is, data points 1 to 5.

The predictor 213 outputs the predictive data by inputting the analytic data derived by the numerical analyzer 211 to the analytic model. The analytic model generated by the analytic model deriver 140. The predictor 213 predicts the result of the numerical analysis having been performed multiple times (k+T) by means of the analytic model. And then, the predictor 213 outputs the predictive data which predicts the result of the numerical analysis having been performed multiple times (k+T). Referring to FIG. 3, the predictor 213 derives the predictive data by predicting the result of the numerical analysis performed multiple times (k+T) with respect to the analytic model based on the base data 1 to 5 of the numerical analyzer 211. For example, the predictor 213 derives the predictive data, that is, data points a to e, that has predicted the result of the numerical analysis performed multiple times (k+T) from the base data 1 to 5. As shown in FIG. 3, the desired output signal $\hat{Y}(k+T)$ may be obtained only after performing the iteration of the numerical analysis multiple times (k+T). However, the predictor 213 may obtain the output signal $\hat{Y}(k+T)$ that is the result of the numerical analysis having been performed multiple times (k+T) by inputting the analytic model based on the base data derived by the kth numerical analysis of the numerical analyzer 211. Accordingly, according to an exemplary embodiment, there is no need to perform the numerical analysis iteration the additional T times, such that the time consumed for analysis can be shortened by as much as the iteration time T.

The predictive optimizer 220 optimizes the analysis result predicted by the analysis predictor 210. The analysis result converges to a specific value as the iteration of the numerical analysis is performed. Accordingly, an exemplary embodiment optimizes the result (the plurality of output signals) predicted by the predictive layer 200 through the optimizer 300. For example, referring to FIG. 3, the predictive optimizer 220 may output, for example, an average value of the predictive data a to e by performing optimization.

The diagnostic layer 300 verifies the abnormality of the analytic data by comparing the actual analytic data output from the analytic layer 400 while the analysis of the analytic layer 400 is performed, with the predictive data that is the prediction result of the analysis generated by the predictive layer 200. This diagnostic layer 300 includes an early alarm 310 and an abnormality diagnostic device 320.

Figure 7:
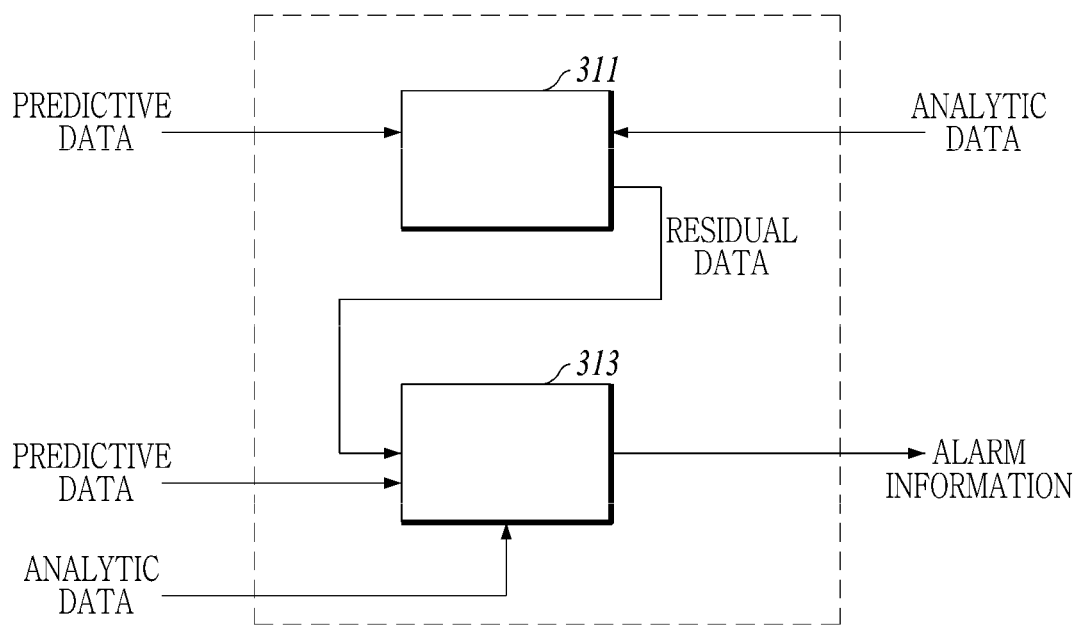
FIG. 7 is a block diagram of an early alarm of FIG. 4 or 5 according to an exemplary embodiment.

The early alarm 310 is configured to generate early alarm information by sorting a cell that satisfies a predetermined early alarm condition among the plurality of cells (CE) around a design target component. For this purpose, the early alarm 310 includes a residual generator 311 and an alarm information device 313 as shown in FIG. 7.

Figure 8:
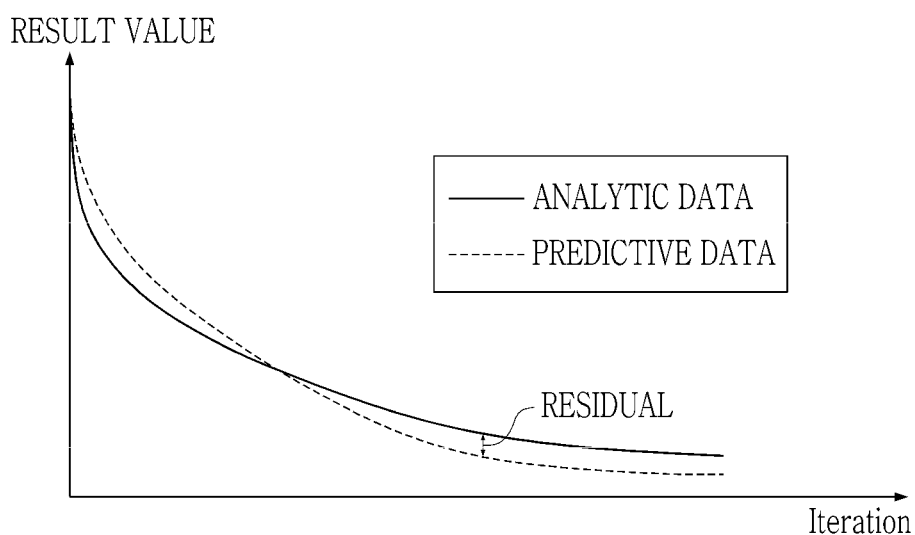
FIG. 8 is a graph plotting analytic data and predictive data according to a number of analysis iterations, showing residual data according to an exemplary embodiment.

As shown in the graph of FIG. 8, the residual generator 311 derives the residual data by receiving both the analytic data according to the numerical analysis of the analytic layer 400, and the predictive data predicted by the predictive layer 200. That is, the residual data indicates a difference between the analytic data (solid line) and the predictive data (dotted line). Here, the analytic data and the predictive data are derived for a plurality of cells, a plurality of cell groups, and all of the cells. Accordingly, the residual data is also derived for the plurality of cells, the plurality of cell groups, and all of the cells.

The alarm information device 313 generates the early alarm information by sorting the cells satisfying the predetermined early alarm condition by comparing the actual analytic data according to the result of the numerical analysis of the analytic layer 400, the predictive data in which the predictive layer 200 has predicted the result of the numerical analysis, and the residual data derived by the residual generator 311. For example, the early alarm condition sets the normal range of each of the analytic data, the predictive data, and the residual data. Accordingly, the alarm information device 313 generates the early alarm information for the cell in which at least one of the analytic data, the predictive data, and the residual data is outside the normal range. The early alarm information includes an identifier for the cell that is outside the normal range, and further includes the analytic data, predictive data, and residual data of the corresponding cell.

The abnormality diagnostic device 320 determines whether the analysis is abnormal based on whether to satisfy a predetermined abnormality condition based on the early alarm information provided by the alarm information device 313. For example, the abnormality diagnostic device 320 determines whether the individual cell, the cell group, or all of the cells satisfies the abnormality condition by continuously performing the iteration by the predetermined number of times or more. According to an exemplary embodiment, the abnormality diagnostic device 320 sequentially determines whether there is the abnormality for the individual cell, determines whether there is the abnormality for each group cell, and determines whether there is the abnormality for all of the cells, and then may finally determine the abnormality by summarizing the determination result. According to another exemplary embodiment, the abnormality diagnostic device 320 may determine whether there is the abnormality for each group cell and determine whether there is the abnormality for all of the cells without determining whether there is the abnormality for the individual cell, and then finally determine the abnormality by summarizing the determination result. According to still another exemplary embodiment, the abnormality diagnostic device 320 may determine whether there is the abnormality for the individual cell, skip whether there is the abnormality for each group cell, and determine whether there is the abnormality for all of the cells, and then finally determine the abnormality by summarizing the determination result.

When diagnosing a symptom as part of an abnormality condition, the abnormality diagnostic device 320 transmits an interruption command to the analytic layer 400, which interrupts the analysis. On the other hand, when diagnosing a symptom as part of a normality condition, the abnormality diagnostic device 320 transmits a continuation command to the analytic layer 400, which continues the analysis. Meanwhile, according to an alternative embodiment, when a normality condition is diagnosed, the abnormality diagnostic device 320 may transmit no corresponding command to the analytic layer 400, thereby instructing the analytic layer 400 to continue the analysis.

Next, a method for diagnosing analysis of the analysis apparatus 10 according to an exemplary embodiment will be described with reference to FIG. 9.

Figure 9:
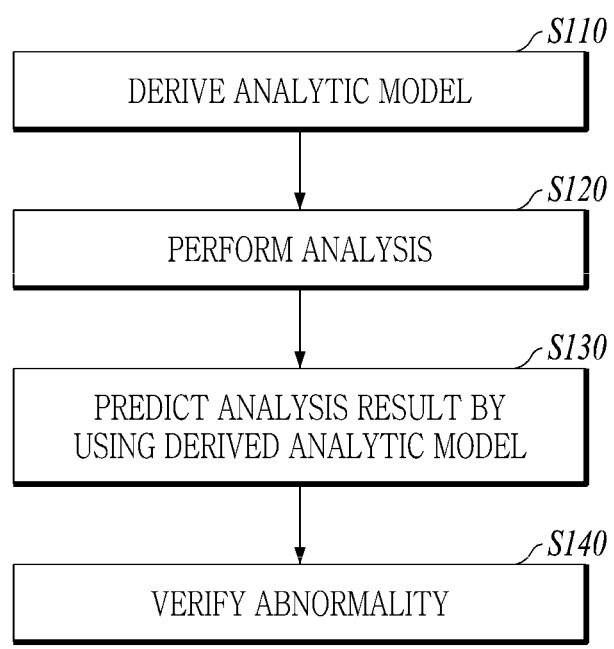
FIG. 9 is a flowchart of an analytic method according to an exemplary embodiment.

Referring to FIG. 9, the model layer 100 derives the analytic model that performs the numerical analysis for the plurality of cells (CE) that divide the peripheral space of the target component (CP) by using the analytic data (operation S110). Here, the analytic data includes a plurality of input signals used for a numerical analysis performing iteration conventionally by some number of times (multiple iterations) and a plurality of output signals corresponding to the plurality of input signals. That is, the analytic model is configured to predict the result by simulating the numerical analysis performing the iteration multiple times.

The analytic layer 400 performs the analysis (operation S120). The analytic layer 400 divides the area around the component (CP) into a plurality of cells, groups the plurality of cells into a plurality of cell groups according to a predetermined rule, and then performs the numerical analysis by computational fluid dynamics (CFD) for each of the plurality of cells, each of the plurality of cell groups, and all of the cells. Particularly, the analytic layer 400 outputs the analytic data by performing the numerical analysis iteration.

Meanwhile, the predictive layer 200 predicts the result of the numerical analysis having performed iteration multiple times for the plurality of cells (CE) of the peripheral space of the target component (CP) through the analytic model previously derived by the model layer 100 (operation S130).

Subsequently, the diagnostic layer 300 verifies the abnormality of the analytic data by comparing the actual analytic data output from the analytic layer 400 while the analysis of the analytic layer 400 is performed, with the predictive data that is the prediction result of the analysis generated by the predictive layer 200 (operation S140).

Next, each of the above-described operations S110, S130, and S140 will be described in more detail with reference to FIGS. 10-12.

Figure 10:
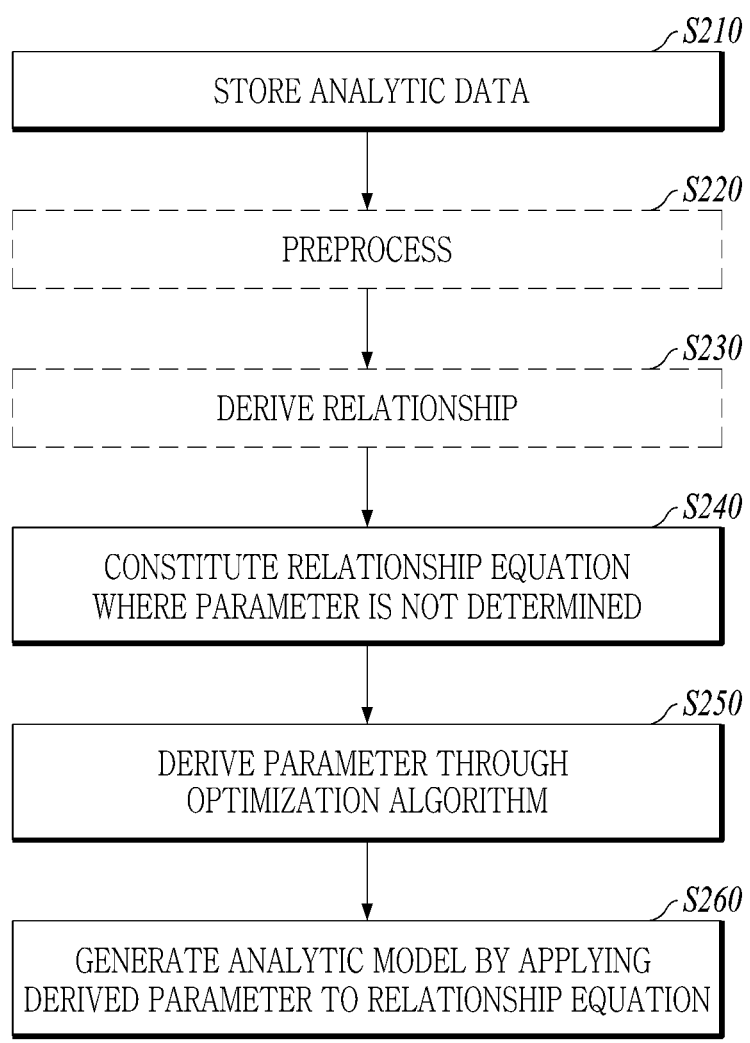
FIG. 10 is a flowchart of the operation to derive the analytic model of FIG. 9.

First, referring to FIG. 10 detailing the operation S110 of FIG. 9, the analytic data storage 110 stores the analytic data including the plurality of input signals used for the numerical analysis and the plurality of output signals corresponding to each of the plurality of input signals (operation S210). The analytic data storage 110 outputs the analytic data.

The preprocessor 120 preprocesses the analytic data (operation S220). The preprocessor 120 removes empty data during the numerical analysis iteration performed by the analytic layer, erroneous data, etc., among the analytic data, or converts the data into correct numeric values. The preprocessor 120 then selects and outputs only the analytic data meeting a predetermined requirement. Subsequently, the data analyzer 130 may derive the relationship between the cells (CE) and the relationship between the data in the cell (CE) by analyzing the analytic data (operation S230). That is, the data analyzer 130 derives the relationship between the cells (CE) and the relationship between the data in the cell (CE) by analyzing the design specification and condition, the relationship between the cells (CE), and the data for each cell (CE). The above-described operations S220 and S230 may be selectively omitted.

The analytic model deriver 140 constitutes the relationship equation of the analytic model where parameters for determining the relationship between the input signal and the output signal are not determined (operation S240). That is, the analytic model deriver 140 constitutes the relationship equation where the parameters for determining the relationship between the input signal and the output signal of the numerical analysis are unknown. Subsequently, the analytic model deriver 140 derives the parameters through the optimization algorithm by substituting the analytic data into the relationship equation (operation S250). That is, the analytic model deriver 140 performs learning for the analytic data through the optimization algorithm. This learning may be, for example, supervised learning, non-supervised learning, etc. Thereafter, the analytic model deriver 140 derives the analytic model by applying the previously derived parameters to the relationship equation (operation S260). This analytic model may predict the result of the numerical analysis having performed iteration multiple times.

Figure 11:
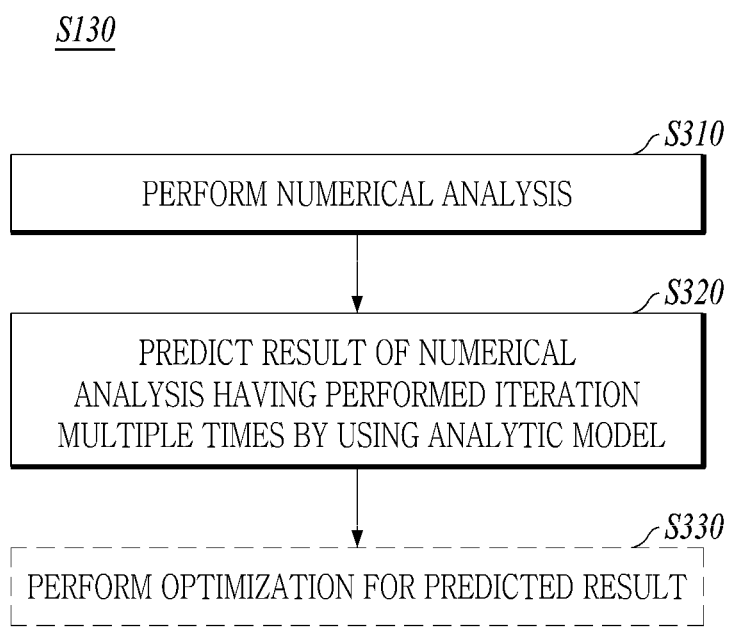
FIG. 11 is a flowchart of the operation to predict the analysis result of FIG. 9.

Next, referring to FIG. 11 detailing the operation S130 of FIG. 9, the numerical analyzer 211 of the predictive layer 200 derives the base data including the input signal and the output signal by the numerical analysis by performing the numerical analysis (operation S310). For example, as shown in FIG. 3, the numerical analyzer 211 may derive the base data 1 to 5.

Subsequently, the predictor 213 of the predictive layer 200 derives the predictive data by predicting the result of the numerical analysis having performed iteration multiple times (k+T) with respect to the analytic model based on the base data 1 to 5 of the numerical analyzer 211 (operation S320). For example, the predictor 213 derives the predictive data a to e predicting the result of the numerical analysis having performed iteration multiple times (k+T) from the base data 1 to 5.

The predictive optimizer 220 optimizes the plurality of output signals that are the prediction results (operation S330). The predictive optimizer 220 may output, for example, an average value of the predictive data a to e by performing the optimization.

Figure 12:
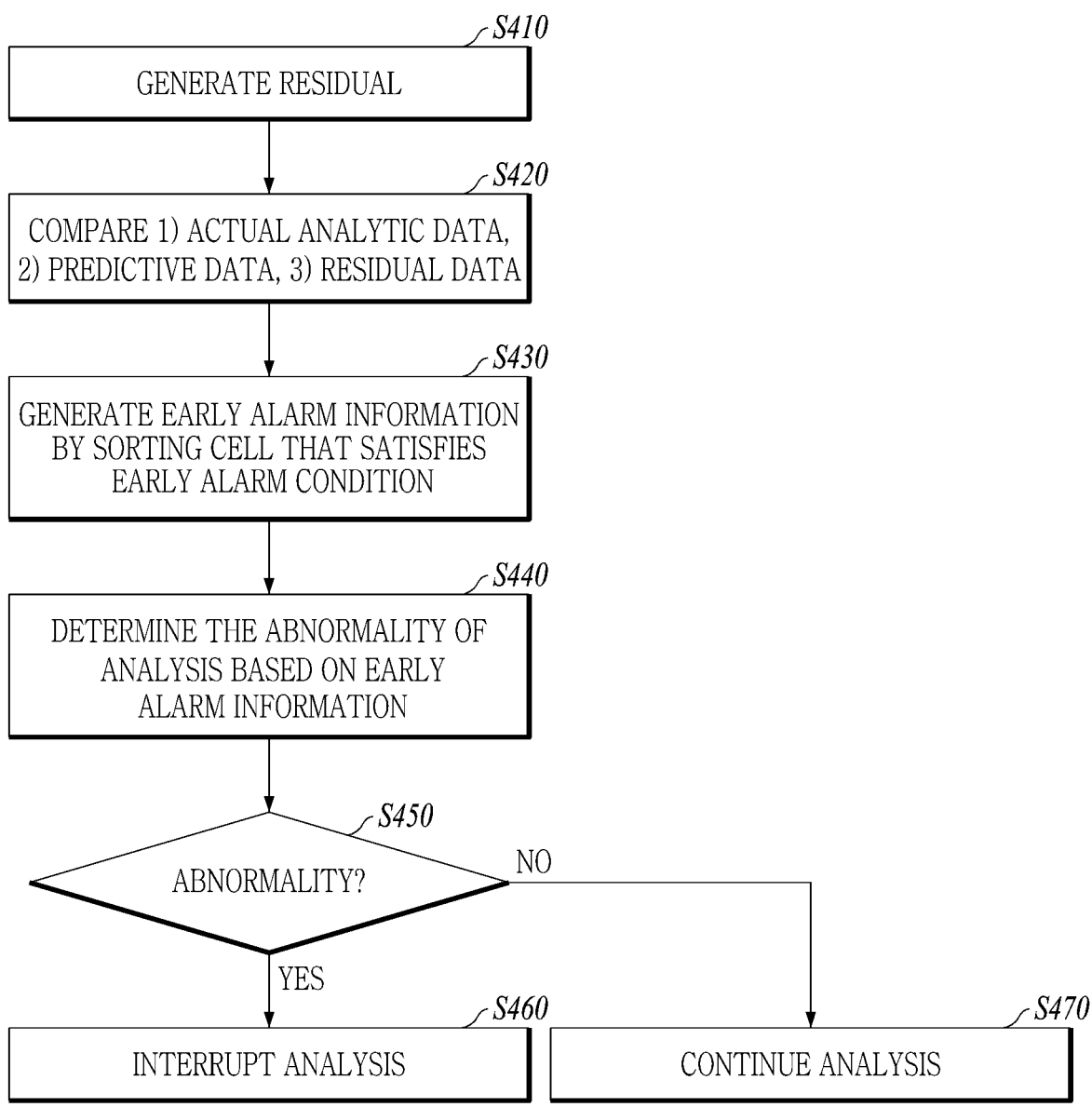
FIG. 12 is a flowchart of the operation to diagnose/verify the abnormality of the analysis of FIG. 9.

Next, referring to FIG. 12 detailing the operation S140 of FIG. 9, the residual generator 311 of the early alarm 310 derives the residual data by receiving the analytic data according to the numerical analysis of the analytic layer 400 and the predictive data predicted by the predictive layer 200 (operation S410). Here, the analytic data and the predictive data are derived for a plurality of cells, a plurality of cell groups, and all of the cells. Accordingly, the residual data is also derived for the plurality of cells, the plurality of cell groups, and all of the cells.

Next, the alarm information device 313 of the early alarm 310 compares the actual analytic data according to the result of the numerical analysis of the analytic layer 400, the predictive data in which the predictive layer 200 has predicted the result of the numerical analysis, and the residual data derived by the residual generator 311 (operation S420).

Subsequently, the alarm information device 313 generates the early alarm information by sorting a cell that satisfies the predetermined early alarm condition as the comparison result (operation S430). For example, the early alarm condition may be one that sets the normal range of each of the analytic data, the predictive data, and the residual data. Accordingly, the alarm information device 313 may generate the early alarm information for the cell in which at least one of the analytic data, the predictive data, and the residual data is outside the normal range. The early alarm information includes an identifier for the cell that is outside the normal range according to the early alarm condition, and the analytic data, predictive data, and residual data of the corresponding cell.

Next, the abnormality diagnostic device 320 determines the abnormality of the analysis according to whether to satisfy the predetermined abnormality condition based on the early alarm information (operation S440). For example, the abnormality diagnostic device 320 determines whether the individual cell, the cell group, or all of the cells satisfies the abnormality condition by continuously performing iteration a predetermined times or more. According to an exemplary embodiment, the abnormality diagnostic device 320 may sequentially determine whether an abnormality is present for the individual cell, whether an abnormality is present for each group cell, and whether an abnormality is present for all of the cells, and then determine the abnormality condition by summarizing the determination result.

According to another exemplary embodiment, the abnormality diagnostic device 320 may determine whether there is an abnormality for each group cell and whether there is an abnormality for all of the cells, without determining whether there is an abnormality for the individual cell, and may then determine the abnormality condition by summarizing the determination result.

According to still another exemplary embodiment, the abnormality diagnostic device 320 may determine whether there is an abnormality for the individual cell, skip whether there is an abnormality for each group cell, and determine whether there is an abnormality for all of the cells, and may then determine the abnormality condition by summarizing the determination result.

When the abnormality diagnostic device 320 determines an abnormality condition (operation S450), the method proceeds to an operation S460. In the alternative, when the abnormality diagnostic device 320 determines a normality condition (operation S450), the method proceeds to an operation S470. Accordingly, when the diagnosing determines the presence of an abnormality condition, the abnormality diagnostic device 320 transmits an interruption command to the analytic layer 400, which interrupts the analysis (operation S460). On the other hand, when diagnosing the condition as a normality, the abnormality diagnostic device 320 transmits a continuation command to the analytic layer 400, which continues the analysis (operation S470). Meanwhile, according to an alternative embodiment, the abnormality diagnostic device 320 may continue the analysis by transmitting no corresponding command or instruction to the analytic layer 400 (operation S470).

Figure 13:
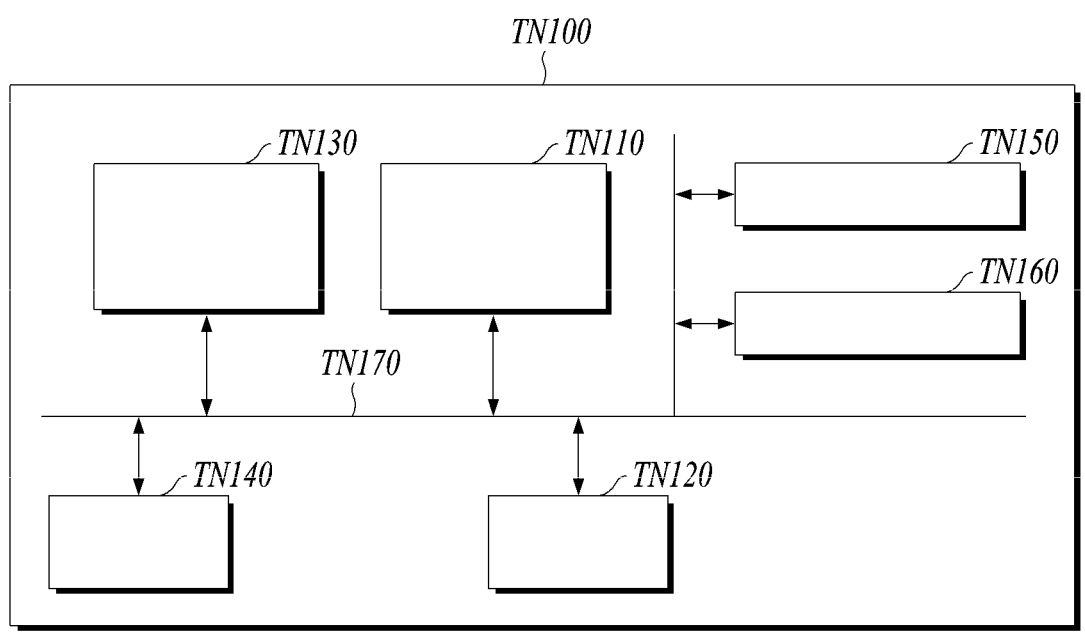
FIG. 13 is a diagram showing a computing apparatus according to an exemplary embodiment.

FIG. 13 shows a computing apparatus according to an exemplary embodiment. A computing apparatus TN100 of FIG. 13 may be the apparatus described in the present specification (e.g., the analysis apparatus, etc.).

In FIG. 13, the computing apparatus TN100 may include at least one processor TN110, a transceiver TN120, and a memory TN130. Further, the computing apparatus TN100 may further include a storage device TN140, an input interface device TN150, an output interface device TN160, etc. The components included in the computing apparatus TN100 may be connected by a bus TN170 and communicate with each other.

The processor TN110 may execute a program command stored in at least one of the memory TN130 and the storage device TN140. The processor TN110 may include a central processing unit (CPU), a graphics processing unit (GPU), or a dedicated processor on which processing may be performed according to an exemplary embodiment. The processor TN110 may be configured to implement the procedures, functions, methods, etc. described in connection with an embodiment of the present disclosure. The processor TN110 may control each component of the computing apparatus TN100.

Each of the memory TN130 and the storage device TN140 may store various information related to an operation of the processor TN110. Each of the memory TN130 and the storage device TN140 may be composed of at least one of a volatile storage medium and a nonvolatile storage medium. For example, the memory TN130 may be composed of at least one of a read only memory (ROM) and a random access memory (RAM).

The transceiver TN120 may transmit and receive a wired signal or a wireless signal. The transceiver TN120 may be connected to a network to perform communication.

Meanwhile, various methods according to an exemplary embodiment described above may be implemented in the form of a readable program through various computer means and recorded in a computer-readable recording medium.

Herein, the recording medium may include program commands, data files, data structures, etc. alone or in combination thereof. The program commands to be recorded on the recording medium may be those specially designed and constructed for the present disclosure or may also be those known and available to those skilled in the art of computer software. For example, the recording medium may include magnetic media such as hard disks, floppy disks, and magnetic tapes, optical media such as CD-ROMs and DVDs, magneto-optical media such as floptical disks, and hardware devices specially configured to store and execute the program commands such as ROMs, RAMs, and flash memory. Examples of the program commands may include not only machine language wires such as those produced by a compiler but also high-level language wires that may be executed by a computer by using an interpreter, etc. This hardware device may be configured to operate as one or more software modules in order to perform the operation of the present disclosure, and vice versa.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A computing apparatus for diagnosing analysis, comprising:
   an analysis circuitry configured to divide a peripheral space of a design target component into a plurality of cells, and to derive analytic data by performing a numerical analysis a first number of iterations according to computational fluid dynamics for the plurality of cells, the analytic data being input and output of the numerical analysis being performed multiple times through multiple iterations;
   a modeling circuitry configured to derive an analytic model that simulates the numerical analysis iteration;
   a prediction circuitry configured to derive predictive data by predicting a result of the numerical analysis through a second number of iterations by using base data, which base data is the result of first number of iterations of the analytic model, the predictive data being input and output of the numerical analysis having performed multiple times through multiple iterations for the plurality of cells associated with the design target component; and
   a diagnosis circuitry configured to diagnose an abnormality condition of numerical analysis by comparing the analytic data with the predictive data at the same time series during the numerical analysis iteration, before the numerical analysis performed by the analysis circuitry is completed.

2. The apparatus for diagnosing the analysis of claim 1, wherein the diagnosis circuitry comprises
   an early alarm configured to generate early alarm information by classifying a cell that satisfies a predetermined early alarm condition among the plurality of cells; and
   an abnormality diagnosis circuitry configured to determine whether the result of the numerical analysis iteration is abnormal based on the early alarm information.

3. The apparatus for diagnosing the analysis of claim 2, wherein the early alarm comprises
   a residual generating circuitry configured to derive residual data by obtaining a difference between the analytic data and the predictive data; and
   an alarm information generating circuitry configured to generate the early alarm information by classifying a cell in which at least one of the analytic data, the predictive data, and the residual data satisfies the predetermined early alarm condition among the plurality of cells.

4. The apparatus for diagnosing the analysis of claim 3, wherein the abnormality diagnosis circuitry transmits an analysis interrupt command to the analysis circuitry so that the analysis circuitry interrupts the numerical analysis iteration, when satisfying a predetermined abnormality condition by determining whether at least one of the plurality of cells, a plurality of cell groups, and all of the cells of the plurality of cells satisfies the predetermined abnormality condition based on the early alarm information.

5. The apparatus for diagnosing the analysis of claim 1, wherein the modeling circuitry comprises
   an analytic data storage configured to store the analytic data comprising a plurality of input signals used for the numerical analysis and a plurality of output signals corresponding to each of the plurality of input signals; and
   an analytic model deriving circuitry configured to generate the analytic model that simulates the numerical analysis iteration through the analytic data.

6. The apparatus for diagnosing the analysis of claim 5, wherein the analytic model deriving circuitry constitutes the relationship equation of the analytic model in which a parameter is not determined, and generates the analytic model by deriving the parameter through learning using the analytic data.

7. The apparatus for diagnosing the analysis of claim 6, wherein the modeling circuitry further comprises a preprocessing circuitry configured to perform preprocessing that corrects or removes the analytic data according to a predetermined condition.

8. The apparatus for diagnosing the analysis of claim 7, wherein the modeling circuitry further comprises a data analysis circuitry configured to derive the relationship between cells of the plurality of cells and the relationship between data in the cells by analyzing the preprocessed analytic data.

9. The apparatus for diagnosing the analysis of claim 1, wherein the prediction circuitry comprises
   a numerical analysis circuitry configured to derive base data by performing the numerical analysis iteration for the plurality of cells occupying the divided peripheral space of the design target component; and
   a predicting circuitry configured to derive the predictive data by applying the base data to the analytic model derived by the modeling circuitry to predict the result of the numerical analysis iteration.

10. The apparatus for diagnosing the analysis of claim 9, wherein the prediction circuitry further comprises a predictive optimizing circuitry configured to optimize the predictive data derived by the predicting circuitry.

11. Anil A computing apparatus for diagnosing analysis, comprising:
    an analysis circuitry configured to divide a peripheral space of a design target component into a plurality of cells, and to derive analytic data by performing numerical analysis a first number of iterations according to computational fluid dynamics for the plurality of cells, the analytic data being input and output of the numerical analysis being performed multiple times through multiple iterations;
a prediction circuitry configured to derive predictive data by predicting a result of the numerical analysis through a second number of iterations by using base data, which base data is the result of first number of iterations of the analytic model that predicts the result of the numerical analysis iteration, the predictive data being input and output of the numerical analysis having performed multiple times through multiple iterations for the plurality of cells associated with the design target component; and
a diagnosis circuitry configured to diagnose an abnormality condition of numerical analysis by comparing the analytic data with the predictive data at the same time series during the numerical analysis iteration, before the numerical analysis performed by the analysis circuitry is completed.

12. The apparatus for diagnosing the analysis of claim 11, wherein the analytic model comprises at least one of a parametric model and a non-parametric model, and
wherein the parametric model comprises a Transfer Function model and a State Space model.

13. The apparatus for diagnosing the analysis of claim 11, wherein the
analytic model includes one of
a model for simulating the numerical analysis iteration for each of the plurality of cells;
a model for simulating the numerical analysis iteration for a cell group comprising a predetermined number of cells adjacent to each other;
a model for simulating the numerical analysis iteration for a cell group comprising cells having characteristics similar to each other; and
a model for simulating the numerical analysis iteration for all of the plurality of cells.

14. The apparatus for diagnosing the analysis of claim 11, wherein the diagnosis circuitry comprises
an early alarm configured to generate early alarm information by classifying a cell that satisfies a predetermined early alarm condition among the plurality of cells; and
an abnormality diagnosis circuitry configured to determine whether the result of the numerical analysis iteration is abnormal based on the early alarm information.

15. A method for diagnosing analysis, comprising:
dividing, by a modeling circuitry, a peripheral space of a design target component into a plurality of cells;
deriving, by the modeling circuitry, an analytic model that simulates numerical analysis iteration according to computational fluid dynamics for the plurality of cells;
deriving, by an analysis circuitry, analytic data by performing the numerical analysis a first number of iterations, the analytic data being input and output of the numerical analysis being performed multiple times through multiple iterations;
deriving, by a prediction circuitry, predictive data by predicting a result of the numerical analysis through a second number of iterations by using base data, which base data is the result of first number of iterations of the analytic model, the predictive data being input and output of the numerical analysis having performed multiple times through multiple iterations for the plurality of cells associated with the design target component; and
diagnosing, by a diagnosis circuitry, an abnormality condition of numerical analysis by comparing the analytic data with the predictive data at the same time series during the numerical analysis iteration, before the numerical analysis performed by the analysis circuitry is completed.

16. The method for diagnosing the analysis of claim 15, wherein the diagnosing the abnormality condition of the numerical analysis comprises
generating, by an early alarm of the diagnosis circuitry, early alarm information by classifying a cell that satisfies a predetermined early alarm condition among the plurality of cells; and
determining, by an abnormality diagnosis circuitry of the diagnosis circuitry, whether the result of the numerical analysis iteration is abnormal based on the early alarm information.

17. The method for diagnosing the analysis of claim 16, wherein the generating the early alarm information comprises
deriving, by a residual generating circuitry of the early alarm, residual data by obtaining a difference between the analytic data and the predictive data; and
generating, by an alarm information generating circuitry of the early alarm, the early alarm information by classifying a cell in which at least one of the analytic data, the predictive data, and the residual data satisfies the predetermined early alarm condition among the plurality of cells.

18. The method for diagnosing the analysis of claim 17, wherein the determining whether the result of the numerical analysis iteration is abnormal comprises
transmitting, by the abnormality diagnosis circuitry, an analysis interrupt command to the analytic layer so that the analysis circuitry interrupts the numerical analysis iteration, when satisfying a predetermined abnormality condition by determining whether at least one of a plurality of cells, a plurality of cell groups, and all of the cells satisfies the predetermined abnormality condition based on the early alarm information.

19. The method for diagnosing the analysis of claim 15, wherein the deriving the analytic model comprises generating, by the modeling circuitry, the analytic model that simulates the numerical analysis iteration through the analytic data comprising a plurality of input signals used for the numerical analysis iteration and a plurality of output signals corresponding to each of the plurality of input signals.

20. The method for diagnosing the analysis of claim 15, wherein the deriving the predictive data comprises
deriving, by a numerical analysis circuitry of the prediction circuitry, base data by performing the numerical analysis iteration for the plurality of cells occupying the divided peripheral space of the design target component; and
deriving, by a predicting circuitry of the prediction circuitry, the predictive data by applying the base data to the analytic model derived by the model layer to predict the result of the numerical analysis iteration.

* * * * *